(12) United States Patent
Nakamura

(10) Patent No.: US 10,570,836 B2
(45) Date of Patent: Feb. 25, 2020

(54) EGR CONTROL APPARATUS FOR ENGINE WITH SUPERCHARGER AND CONTROL METHOD OF EGR DEVICE FOR ENGINE WITH SUPERCHARGER

(71) Applicant: AISAN KOGYO KABUSHIKI KAISHA, Obu-shi, Aichi-ken (JP)

(72) Inventor: Takehide Nakamura, Handa (JP)

(73) Assignee: AISAN KOGYO KABUSHIKI KAISHA, Obu-Shi (JP)

(*) Notice: Subject to any disclaimer, the term of this patent is extended or adjusted under 35 U.S.C. 154(b) by 135 days.

(21) Appl. No.: 15/991,743

(22) Filed: May 29, 2018

(65) Prior Publication Data

US 2018/0363576 A1    Dec. 20, 2018

(30) Foreign Application Priority Data

Jun. 14, 2017  (JP) ................................. 2017-116880
May 14, 2018  (JP) ................................. 2018-092895

(51) Int. Cl.
*F02D 41/00* (2006.01)
*F02M 26/06* (2016.01)
(Continued)

(52) U.S. Cl.
CPC ......... *F02D 41/0077* (2013.01); *F02D 21/08* (2013.01); *F02D 41/0007* (2013.01);
(Continued)

(58) Field of Classification Search
CPC ............. F02D 41/0077; F02D 41/2464; F02D 41/123; F02D 21/08; F02D 41/0072; F02D 41/0007; F02D 41/18; F02D 2250/16; F02D 2041/0017; F02D 2021/083; F02D 41/0047; F02M 26/06; F02M 26/47; F02M 26/64

See application file for complete search history.

(56) References Cited

U.S. PATENT DOCUMENTS

2014/0261344 A1    9/2014    Makino et al.

FOREIGN PATENT DOCUMENTS

EP    0887532 A2 *  12/1998  ............ F02D 11/107
EP    2128407 A1    12/2009
(Continued)

*Primary Examiner* — Jacob M Amick
*Assistant Examiner* — Charles Brauch
(74) *Attorney, Agent, or Firm* — Oliff PLC

(57) ABSTRACT

A low-pressure loop EGR device for an engine with a supercharger, EGR passage, and EGR valve. An ECU controls the EGR valve to fully close, the intake valve to fully open, and the throttle valve to open at a sonic opening degree during deceleration and fuel cut-off. The ECU obtains an actual opening degree of the throttle valve based on the detected intake amount and a predetermined reference formula of valve passing flow rate. The ECU performs correction control of the throttle valve based on a throttle opening degree correction value learned from a difference of the actual opening degree and the predetermined opening degree. The ECU obtains an actual opening degree of the intake valve similarly to the above, and performs correction control of the intake valve based on an intake opening degree correction value learned by the difference between the actual opening degree and the predetermined opening degree.

4 Claims, 9 Drawing Sheets

(51) Int. Cl.
*F02D 21/08* (2006.01)
*F02M 26/47* (2016.01)
*F02M 26/64* (2016.01)
*F02D 41/18* (2006.01)
*F02D 41/24* (2006.01)
*F02D 41/12* (2006.01)

(52) U.S. Cl.
CPC ....... *F02D 41/0072* (2013.01); *F02D 41/123* (2013.01); *F02D 41/18* (2013.01); *F02D 41/2464* (2013.01); *F02M 26/06* (2016.02); *F02M 26/47* (2016.02); *F02M 26/64* (2016.02); *F02D 2021/083* (2013.01); *F02D 2041/0017* (2013.01); *F02D 2250/16* (2013.01)

(56) References Cited

FOREIGN PATENT DOCUMENTS

| | | | |
|---|---|---|---|
| JP | 2008-248729 | A | 10/2008 |
| JP | 2009-085075 | A | 4/2009 |
| JP | 2014-181561 | A | 9/2014 |

\* cited by examiner

FIG.8

| | | | MEASUREMENT ORDER | | |
|---|---|---|---|---|---|
| | | | EVENT (1) | EVENT (2) | EVENT (3) |
| MASTER OPENING DEGREE | THROTTLE OPENING DEGREE | deg | THROTTLE OPENING DEGREE CORRECTION 7 (INCL. GAPS) | INTAKE OPENING DEGREE CORRECTION EQUIVALENT TO 7 (POST-CORRECTION) | EGR OPENING DEGREE CORRECTION EQUIVALENT TO 7 (POST-CORRECTION) |
| | INTAKE OPENING DEGREE | deg | 90 | 8 (INCL. GAPS) | EQUIVALENT TO 8 (POST-CORRECTION) |
| | EGR OPENING DEGREE | % | 0 | 0 | 25 (INCL. GAPS) |
| FLOW VELOCITY | THROTTLE VALVE | | SONIC SPEED | SONIC SPEED | SONIC SPEED |
| | INTAKE VALVE | | SUBSONIC SPEED | SUBSONIC SPEED | SUBSONIC SPEED |
| | EGR VALVE | | — | — | SUBSONIC SPEED |
| MEASUREMENT ITEM (INTAKE AMOUNT) | | | ABSOLUTE FLOW RATE | ABSOLUTE FLOW RATE | CHANGING FLOW RATE FROM (2) |
| SPECIFIED ITEM | THROTTLE VALVE OPEN AREA | | ○ | NARROWED OPENING DEGREE CORRECTION | |
| | INTAKE NEGATIVE PRESSURE | | | ○ | |
| | INTAKE VALVE OPEN AREA | | | ○ | |
| | EGR VALVE OPEN AREA | | | | ○ |

EGR CONTROL APPARATUS FOR ENGINE WITH SUPERCHARGER AND CONTROL METHOD OF EGR DEVICE FOR ENGINE WITH SUPERCHARGER

CROSS-REFERENCE TO RELATED APPLICATIONS

The present disclosure is based upon and claims the benefit of priorities from the prior Japanese Patent Applications No. 2017-116880 filed on Jun. 14, 2017 and No. 2018-092895 filed on May 14, 2018, the entire contents of which are incorporated herein by reference.

BACKGROUND

Technical Field

The present disclosure relates to a low-pressure loop EGR device formed with an engine provided with a supercharger, and particularly, to an EGR control apparatus for an engine with a supercharger configured to control the EGR device and a control method thereof.

Related Art

JP2008-248729A has been known as one example of this type of technique. This technique relates to a low-pressure loop EGR device formed with an engine with a supercharger. The EGR device is provided with an EGR passage through which a part of exhaust gas discharged out from the engine to an exhaust passage is brought into an intake passage upstream of a compressor of the supercharger as EGR gas, an EGR valve to regulate an EGR gas flow rate in the EGR passage, an intake valve provided in the intake passage upstream of an outlet of the EGR passage, a pressure sensor to detect pressure between the intake valve and the EGR valve, and an electronic control unit (ECU) to control the intake valve based on a detected pressure value so that a pressure difference within a predetermined range is generated between an upstream side and a downstream side of the EGR valve. This device enables control of the intake valve by the ECU based on the detected pressure value such that the pressure difference within the predetermined range is generated between the upstream side and the downstream side of the EGR valve. Accordingly, a desired pressure difference is generated between the upstream side and the downstream side of the EGR valve, and thus EGR gas at a desired flow rate is stably supplied to the engine.

SUMMARY

Technical Problems

There is, however, a problem in the technique of JP2008-248729A that some opening variations in the intake valve (including manufacturing variations within tolerance and chronological changes) may cause variations in negative pressure which is to be applied to an outlet of the EGR passage. Further, the EGR valve also has some opening variations (including manufacturing variations within the tolerance and chronological changes), and this may cause variations in a flow rate of the EGR gas flowing through the EGR valve. There may still further be a problem that the opening variations in the intake valve and the opening variations in the EGR valve have complex influence on the EGR gas flow rate. This means that simply controlling the intake valve and the EGR valve may result in deterioration in control accuracy of the EGR gas flow rate. Another problem of JP2008-248729A is increase in manufacturing cost due to application of a pressure sensor for controlling the intake valve. Further, the application of the pressure sensor has another concern of being influenced by the EGR gas.

The present disclosure has been made to address the above problems and has a purpose of providing an EGR control apparatus for an internal combustion engine with a supercharger and a method of controlling an EGR device for an internal combustion engine with a supercharger, the apparatus and the method achieving accurate regulation of an EGR gas flow rate with no use of a specialized pressure sensor irrespective of opening variations in an intake valve. Another purpose of the present disclosure is to provide an EGR control apparatus for an internal combustion engine with a supercharger and a method of controlling an EGR device for an internal combustion engine with a supercharger, the apparatus and the method achieving accurate control of an EGR gas flow rate with no use of a specialized pressure sensor irrespective of opening variations in an intake valve and an EGR valve.

Means of Solving the Problems

One aspect of the present disclosure provides an EGR control apparatus for an engine with a supercharger comprising: the supercharger provided in an intake passage and an exhaust passage for the engine to increase pressure of intake air flowing in the intake passage, the supercharger including a compressor placed in the intake passage, a turbine placed in the exhaust passage, and a rotary shaft connecting the compressor and the turbine in an integrally rotatable manner; an EGR passage configured to bring a part of exhaust gas having been discharged out from the engine to the exhaust passage into the intake passage so that the exhaust air is recirculated into the engine as EGR gas, the EGR passage having an inlet connected to the exhaust passage downstream of the turbine and an outlet connected to the intake passage upstream of the compressor; an EGR valve configured to regulate a flow rate of the EGR gas flowing in the EGR passage; an intake amount regulation valve provided in the intake passage downstream of the compressor for regulating an intake amount of intake air flowing through the intake passage; an intake valve provided in the intake passage upstream of the outlet of the EGR passage for narrowing the intake amount of the intake air flowing through the intake passage; an intake amount detection member for detecting the intake amount of the intake air flowing through the intake passage upstream of the intake valve; and a control unit for controlling at least the EGR valve, the intake amount regulation valve, and the intake valve, wherein the control unit obtains an actual opening degree of the intake amount regulation valve based on the intake amount detected by the intake amount detection member and a reference formula of a valve passing flow rate when the EGR valve is made to fully close and the intake valve is made to fully open and the intake amount regulation valve is made to open at a predetermined opening degree such that the intake air flows through the intake amount regulation valve at sonic speed, the control unit learns an opening degree correction value of the intake amount regulation valve from a difference between the obtained actual opening degree and the predetermined opening degree, and the control unit performs correction control of the intake amount regulation valve based on the learned opening degree correction value, in which the reference formula is represented as: $dm = A \cdot Cq \cdot Cm \cdot Pup/\sqrt{Tup}$ (F) where dm denotes an intake amount, A denotes an opening area of a valve, Cq denotes a discharge coefficient of the valve, Cm denotes a flow coefficient of the valve, Pup denotes pressure on an upstream side of the valve, Tup denotes a temperature on the upstream side of the valve, the control unit obtains an actual opening degree of the intake valve based on the intake amount detected by the intake amount detection member and the reference formula (F) when the EGR valve is made to fully close and the intake valve is made to close at a predetermined opening degree after the control unit performs correction control of the intake amount regulation valve based on the learned opening degree correction value of the intake amount regulation valve, the control unit learns an opening degree correction value of the intake valve based on a difference between the obtained actual opening degree and the predetermined opening degree of the intake valve, and the control unit performs correction control of the intake valve based on the learned opening degree correction value.

Another aspect of the present disclosure provides an EGR control apparatus for an engine with a supercharger comprising: the supercharger provided in an intake passage and an exhaust passage for the engine to increase pressure of intake air flowing in the intake passage, the supercharger including a compressor placed in the intake passage, a turbine placed in the exhaust passage, and a rotary shaft connecting the compressor and the turbine in an integrally rotatable manner; an EGR passage configured to bring a part of exhaust gas having been discharged out from the engine to the exhaust passage into the intake passage so that the exhaust air is recirculated into the engine as EGR gas, the EGR passage having an inlet connected to the exhaust passage downstream of the turbine and an outlet connected to the intake passage upstream of the compressor; an EGR valve configured to regulate a flow rate of the EGR gas flowing in the EGR passage; an intake amount regulation valve provided in the intake passage downstream of the compressor for regulating an intake amount of intake air flowing through the intake passage; an intake valve provided in the intake passage upstream of the outlet of the EGR passage for narrowing the intake amount of the intake air flowing through the intake passage; an intake amount detection member for detecting the intake amount of the intake air flowing through the intake passage upstream of the intake valve; and a control unit for controlling at least the EGR valve, the intake amount regulation valve, and the intake valve, wherein during deceleration and fuel cut-off of the engine, the control unit obtains an actual opening degree of the intake amount regulation valve based on the intake amount detected by the intake amount detection member and a reference formula of a valve passing flow rate when the EGR valve is made to fully close and the intake valve is made to fully open and the intake amount regulation valve is made to open at a predetermined opening degree such that the intake air flows through the intake amount regulation valve at sonic speed, the control unit learns an opening degree correction value of the intake amount regulation valve from a difference between the obtained actual opening degree and the predetermined opening degree, and the control unit performs correction control of the intake amount regulation valve based on the learned opening degree correction value, in which the reference formula is represented as: $dm = A \cdot Cq \cdot Cm \cdot Pup/\sqrt{Tup}$ (F) where dm denotes an intake amount, A denotes an opening area of a valve, Cq denotes a discharge coefficient of the valve, Cm denotes a flow coefficient of the valve, Pup denotes pressure on an upstream side of the valve, Tup denotes a temperature on the upstream side of the valve, during deceleration and fuel cut-off of the engine, the control unit obtains an actual opening degree of the intake valve based on the intake amount detected by the intake amount detection member and the reference formula (F) when the EGR valve is made to fully close and the intake valve is made to close at a predetermined opening degree after the control unit performs correction control of the intake amount regulation valve based on the learned opening degree correction value of the intake amount regulation valve, the control unit learns an opening degree correction value of the intake valve based on a difference between the obtained actual opening degree and the predetermined opening degree of the intake valve, and the control unit performs correction control of the intake valve based on the learned opening degree correction value.

Another aspect of the present disclosure provides a control method of an EGR device for an engine with a supercharger, the engine comprising: the supercharger provided in an intake passage and an exhaust passage for the engine to increase pressure of intake air flowing in the intake passage, the supercharger including a compressor placed in the intake passage, a turbine placed in the exhaust passage, and a rotary shaft connecting the compressor and the turbine in an integrally rotatable manner, and an intake amount regulation valve provided in the intake passage downstream of the compressor for regulating an intake amount of intake air flowing through the intake passage, the EGR device comprising: an EGR passage configured to bring a part of exhaust gas having been discharged out from the engine to the exhaust passage into the intake passage so that the exhaust gas is recirculated into the engine as EGR gas, the EGR passage having an inlet connected to the exhaust passage downstream of the turbine and an outlet connected to the intake passage upstream of the compressor; an EGR valve for regulating a flow rate of EGR gas flowing in the EGR passage; and an intake valve provided in the intake passage upstream of the outlet of the EGR passage for narrowing the intake amount of the intake air passing through the intake passage, wherein the control method includes: obtaining an actual opening degree of the intake amount regulation valve based on the intake amount detected by the intake amount detection member and a reference formula of a valve passing flow rate when the EGR valve is made to fully close, the intake valve is made to fully close, and the intake amount regulation valve is made to open at a predetermined opening degree so that the intake air passes through the intake amount regulation valve at sonic speed, in which the reference formula is represented as: $dm = A \cdot Cq \cdot Cm \cdot Pup/\sqrt{Tup}$ (F) where dm denotes the intake amount, A denotes an opening area of a valve, Cq denotes a discharge coefficient of the valve, Cm denotes a flow coefficient of the valve, Pup denotes pressure on an upstream side of the valve, and Tup denotes a temperature on the upstream side of the valve, learning an opening degree correction value of the intake amount regulation valve based on a difference between the obtained actual opening degree of the intake amount regulation valve and the predetermined opening degree and correcting control of the intake amount regulation valve based on the learned opening degree correction value, after correcting control of the intake amount regulation valve, obtaining an actual opening degree of the intake valve based on the intake amount detected by the intake amount detection member and the reference formula (F) when the EGR valve is made to fully close and the intake valve is made to close at a predetermined opening degree after performing correction control of the intake amount regulation valve based on the learned opening degree correction value of the intake amount regulation valve, and learning an opening degree correction value of the intake valve from a difference between the obtained actual opening degree of the intake valve and the predetermined opening degree of the intake valve and performing correction control of the intake valve based on the learned opening degree correction value.

Another aspect of the present disclosure provides a control method of an EGR device for an engine with a supercharger, the engine comprising: the supercharger provided in an intake passage and an exhaust passage for the engine to increase pressure of intake air flowing in the intake passage, the supercharger including a compressor placed in the intake passage, a turbine placed in the exhaust passage, and a rotary shaft connecting the compressor and the turbine in an integrally rotatable manner, and an intake amount regulation valve provided in the intake passage downstream of the compressor for regulating an intake amount of intake air flowing through the intake passage, the EGR device comprising: an EGR passage configured to bring a part of exhaust gas having been discharged out from the engine to the exhaust passage into the intake passage so that the exhaust gas is recirculated into the engine as EGR gas, the EGR passage having an inlet connected to the exhaust passage downstream of the turbine and an outlet connected to the intake passage upstream of the compressor; an EGR valve for regulating a flow rate of EGR gas flowing in the EGR passage; and an intake valve provided in the intake passage upstream of the outlet of the EGR passage for narrowing the intake amount of the intake air passing through the intake passage, wherein the control method includes: during deceleration and fuel cut-off of the engine, obtaining an actual opening degree of the intake amount regulation valve based on the intake amount detected by the intake amount detection member and a reference formula of a valve passing flow rate when the EGR valve is made to fully close, the intake valve is made to fully close, and the intake amount regulation valve is made to open at a predetermined opening degree so that the intake air passes through the intake amount regulation valve at sonic speed, in which the reference formula is represented as: $dm = A \cdot Cq \cdot Cm \cdot Pup/\sqrt{Tup}$ (F) where dm denotes the intake amount, A denotes an opening area of a valve, Cq denotes a discharge coefficient of the valve, Cm denotes a flow coefficient of the valve, Pup denotes pressure on an upstream side of the valve, and Tup denotes a temperature on the upstream side of the valve, learning an opening degree correction value of the intake amount regulation valve based on a difference between the obtained actual opening degree of the intake amount regulation valve and the predetermined opening degree and correcting control of the intake amount regulation valve based on the learned opening degree correction value, during deceleration and fuel cut-off of the engine after correcting control of the intake amount regulation valve, obtaining an actual opening degree of the intake valve based on the intake amount detected by the intake amount detection member and the reference formula (F) when the EGR valve is made to fully close and the intake valve is made to close at a predetermined opening degree after performing correction control of the intake amount regulation valve based on the learned opening degree correction value of the intake amount regulation valve, and learning an opening degree correction value of the intake valve from a difference between the obtained actual opening degree of the intake valve and the predetermined opening degree of the intake valve and performing correction control of the intake valve based on the learned opening degree correction value.

According to the present disclosure, the EGR gas flow rate can be accurately regulated with no use of a specialized pressure sensor irrespective of opening variations in the intake valve.

BRIEF DESCRIPTION OF THE DRAWINGS

FIG. 8 is a table arranged and illustrated with master opening degree, flow velocity, measured items (intake amount), and specified items for each of throttle opening degree correction (event (1)), intake opening degree correction (event (2)), and EGR opening degree correction (event (3)) in the embodiment.

DETAILED DESCRIPTION OF THE EXEMPLARY EMBODIMENTS

A detailed description of an embodiment of a gasoline engine system which is one of typical embodiments of an EGR control apparatus for an engine with a supercharger and a control method of an EGR device will now be given referring to the accompanying drawings.

<Overview of Engine System>

Figure 1:
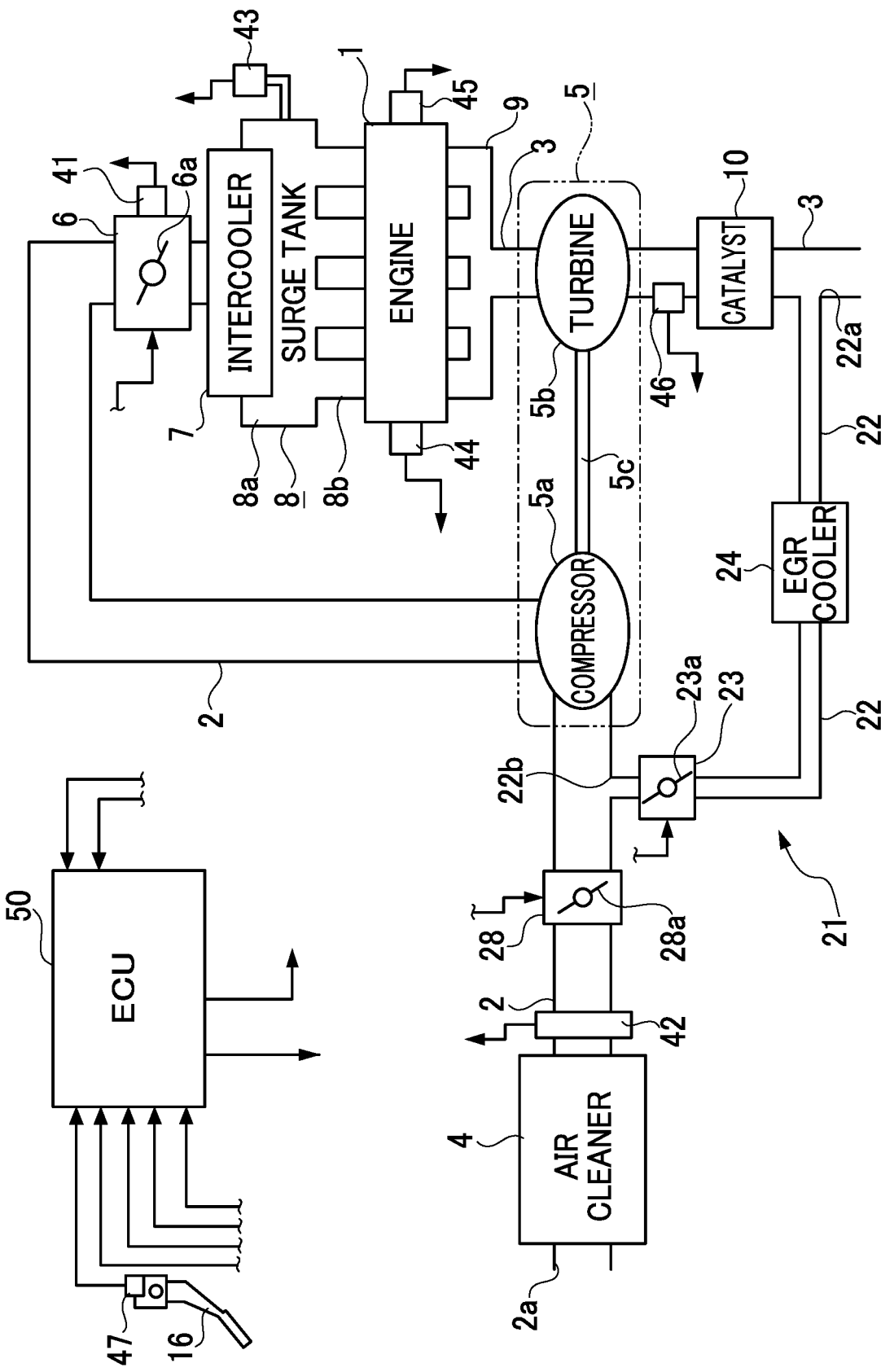
FIG. 1 is a schematic configurational view of a gasoline engine system in an embodiment.

FIG. 1 shows a schematic configurational view of a gasoline engine system. The gasoline engine system mounted in an automobile (hereinafter, referred simply as an "engine system") includes an engine 1 provided with a plurality of cylinders. This engine 1 is a four-stroke-cycle reciprocal engine with four cylinders and includes known configuration such as pistons and a crank shaft. The engine 1 is formed with an intake passage 2 for introducing intake air into each cylinder and an exhaust passage for discharging exhaust air out of each cylinder of the engine 1. A supercharger 5 is placed in the intake passage 2 and the exhaust passage 3. In the intake passage 2, there are provided an intake inlet 2a, an air cleaner 4, a compressor 5a of the supercharger 5, an electronic throttle device 6, an intercooler 7, and an intake manifold 8 in this order from an upstream side of the passage 2.

The electronic throttle device 6 placed upstream of the intake manifold 8 in the intake passage 2 is driven to open or close according to a driver's operation of an accelerator, and thus an intake amount of intake air flowing through the intake passage 2 is regulated. In the present embodiment, the electronic throttle device 6 is constituted by a DC-motor-operated valve and includes a throttle valve 6a, which is to be driven to open or close, and a throttle sensor 41 to detect an opening degree (throttle opening degree) TA of the throttle valve 6a. The electronic throttle device 6 corresponds to one example of an intake amount regulating valve of the present disclosure. The intake manifold 8 placed directly upstream of the engine 1 is provided with a surge tank 8a, which is to be introduced with the intake air, and a plurality (four) of branch pipes 8b to distribute the intake air introduced in the surge tank 8a to each cylinder of the engine 1. The exhaust passage 3 is provided with an exhaust manifold 9, a turbine 5b of the supercharger 5, and a catalyst 10 in this order from an upstream side of the passage 3. The catalyst 10 is provided to purify exhaust air and may be constituted as three-way catalyst.

The supercharger 5 provided to increase pressure of the intake air in the intake passage 2 is provided with the compressor 5a placed in the intake passage 2, the turbine 5b placed in the exhaust passage 3, and a rotary shaft 5c connecting the compressor 5a and the turbine 5b in an integrally rotatable manner. Rotation operation of the turbine 5b rotated by the exhaust air flowing through the exhaust passage 3 and rotation of the compressor 5a rotated in association with the rotation of the turbine 5b cause increase in the pressure of the intake air flowing through the intake passage 2. An intercooler 7 is provided to cool down the intake air which has been increased its pressure by the compressor 5a.

The engine 1 is provided with fuel injection devices (not shown) to inject fuel to the corresponding respective cylinders. The fuel injection devices are configured to inject fuel which has been supplied from a fuel supply device (not shown) into each cylinder of the engine 1. In each cylinder, the fuel injected from the fuel injection device and the intake air introduced from the intake manifold 8 form combustible gas mixture.

The engine 1 is further provided with ignition devices (not shown) each corresponding to the respective cylinders. The ignition devices are configured to ignite the combustible gas mixture formed in each cylinder. The combustible gas mixture in each cylinder explodes and burns by ignition operation of the ignition devices, and the exhaust air after burning is discharged out of each cylinder to outside through the exhaust manifold 9, the turbine 5b, and the catalyst 10. During this operation, pistons (not shown) in the cylinders are moved upward and downward to rotate the crank shaft (not shown), thereby applying motive power to the engine 1.

Engine system of the present embodiment is provided with a low-pressure loop exhaust recirculation device (EGR device) 21. The EGR device 21 is a device for bringing a part of the exhaust air discharged out from each cylinder to the exhaust passage 3 into the intake passage 2 as exhaust recirculation gas (EGR gas) so that the air recirculates into each cylinder of the engine 1. The EGR device 21 is provided with an exhaust recirculation passage (EGR passage) 22 to let flow the EGR gas from the exhaust passage 3 to the intake passage 2 and an exhaust recirculation valve (EGR valve) 23 to regulate an EGR gas flow rate in the EGR passage 22. The EGR passage 22 includes an inlet 22a and an outlet 22b. The inlet 22a of the EGR passage 22 is connected to the exhaust passage 3 downstream of the catalyst 10, and the outlet 22b of the passage 22 is connected to the intake passage 2 upstream of the compressor 5a. The EGR passage 22 is further provided with an EGR cooler 24 upstream of the EGR valve 23 to cool down the EGR gas.

In the present embodiment, the EGR valve 23 is constituted by a DC-motor-operated valve and provided with a valve element 23a driven to be variable in its opening degree. The EGR valve 23 preferably has characteristics of a large flow rate, high responsivity, and high resolution. As a structure of the EGR valve 23, the present embodiment may adapt a "double eccentric valve" described in JP Patent No. 5759646, for example. This type of double eccentric valve is configured to enable large flow-rate regulation.

In the present engine system, the EGR valve 23 is opened in a supercharging region where the supercharger 5 is operated (where an intake amount is relatively large). Thus, a part of the exhaust air flowing through the exhaust passage 3 is brought into the EGR passage 22 from the inlet 22a as EGR gas, and then brought into the intake passage 2 via the EGR cooler 24 and the EGR valve 23 to be further recirculated into each cylinder of the engine 1 through the compressor 5a, the electronic throttle device 6, the intercooler 7, and the intake manifold 8.

In the present embodiment, an intake valve 28 is provided downstream of the air cleaner 4 and upstream of the outlet 22b of the EGR passage 22 in the intake passage 2 for adjusting a flow passage area of the passage 2. The intake valve 28 of the present embodiment is constituted by a DC-motor-operated valve and includes a butterfly-type valve element 28a which is driven to be open or close. The intake valve 28 is configured to narrow an opening degree of the valve element 28a when the EGR gas is introduced from the outlet 22b of the EGR passage 22 to the intake passage 2 so that the intake air in the outlet 22b and its surroundings is put under negative pressure.

<Electrical Configuration of Engine System>

As shown in FIG. 1, sensors 41 to 47 provided in the engine system correspond to one example of an operation state detection member to detect operation state of the engine 1. An air flow meter 42 provided near the air cleaner 4 detects an intake amount Ga of the intake gas flowing from the air cleaner 4 to the intake passage 2 and outputs an electric signal according to a detected value. The air flow meter 42 corresponds to one example of an intake amount detection member of the present disclosure. An intake pressure sensor 43 provided in the surge tank 8a detects intake pressure PM on a downstream side of the electronic throttle device 6 and outputs an electric signal according to a detected value. A water temperature sensor 44 provided in the engine 1 detects a temperature (coolant temperature) THW of cooling water flowing inside the engine 1 and outputs an electric signal according to a detected value. A rotation speed sensor 45 provided in the engine 1 detects rotational speed of the crank shaft as rotation speed (engine rotation speed) NE of the engine 1 and outputs an electric signal according to a detected value. An oxygen sensor 46 provided in the exhaust passage 3 detects oxygen concentration (output voltage) Ox in the exhaust air, which has been discharged out to the exhaust passage 3, and outputs an electric signal according to a detected value. An accelerator pedal 16 provided in a driver's seat is provided with an accelerator sensor 47. The accelerator sensor 47 detects a pressed angle of the accelerator pedal 16 as an accelerator opening degree ACC and outputs an electric signal according to a detected value.

The engine system includes an electronic control unit (ECU) 50 taking in charge of various control operations. To the ECU 50, each of the sensors 41 to 47 is connected. Further to the ECU 50, the electronic throttle device 6, the EGR valve 23, the intake valve 28, and others are each connected.

In the present embodiment, the ECU 50 takes every signal which is output from the sensors 41 to 47 and controls the respective injectors and ignition coils in order to carry out fuel injection control and ignition timing control based on those signals. The ECU 50 further controls the electronic throttle device 6, the EGR valve 23, and the intake valve 28 to carry out intake air control and EGR control based on the respective signals.

The intake air control specifically stands for regulating the intake amount of the intake air which is to be introduced in the engine 1 by controlling the electronic throttle device 6 based on the value detected by the accelerator sensor 47 according to the driver's operation of the accelerator pedal 16. During deceleration of the engine 1, the ECU 50 is configured to control the electronic throttle device 6 to be brought in a valve closing direction so that flow of the intake air is narrowed. The EGR control specifically stands for regulating the flow rate of the EGR gas which it to be recirculated into the engine 1 by controlling the EGR valve 23 and the intake valve 28 according to the operation state of the engine 1. The ECU 50 is configured to control the EGR valve 23 to be fully closed during deceleration of the engine 1 so that flow of the EGR gas into the engine 1 is cut off (EGR cut-off).

As well known, the ECU 50 includes a central processing unit (CPU), various memories, an external input circuit, an external output circuit, and others. Each memory stores predetermined control program related to each control operation of the engine 1. The CPU is configured to carry out the above control operations according to predetermined control program based on the detected values which are input by the sensors 41 to 47 through the input circuit. The ECU 50 of the present embodiment corresponds to one example of a control unit of the present disclosure.

As for the EGR device 21 of the present embodiment, the intake valve 28 and the EGR valve 23 have some opening variations (including manufacturing variations within the tolerance and chronological changes). The opening variations in the intake valve 28 may cause deviation from a target value in the negative pressure subjected to the outlet 22b of the EGR passage 22. Further, the opening variations in the EGR valve 23 may cause deviation from a target value in the flow rate of the EGR gas flowing from the EGR passage 22 to the intake passage 2. There is thus a possibility of degradation in the control accuracy of the EGR gas flow rate when the ECU 50 carries out the EGR control. To address this, the ECU 50 of the present embodiment is made to carry out the following EGR correction control to improve the accuracy in regulating the EGR gas flow rate irrespective of the opening variations in the intake valve 28 and the opening variations in the EGR valve 23.

<EGR Correction Control>

Figure 2:
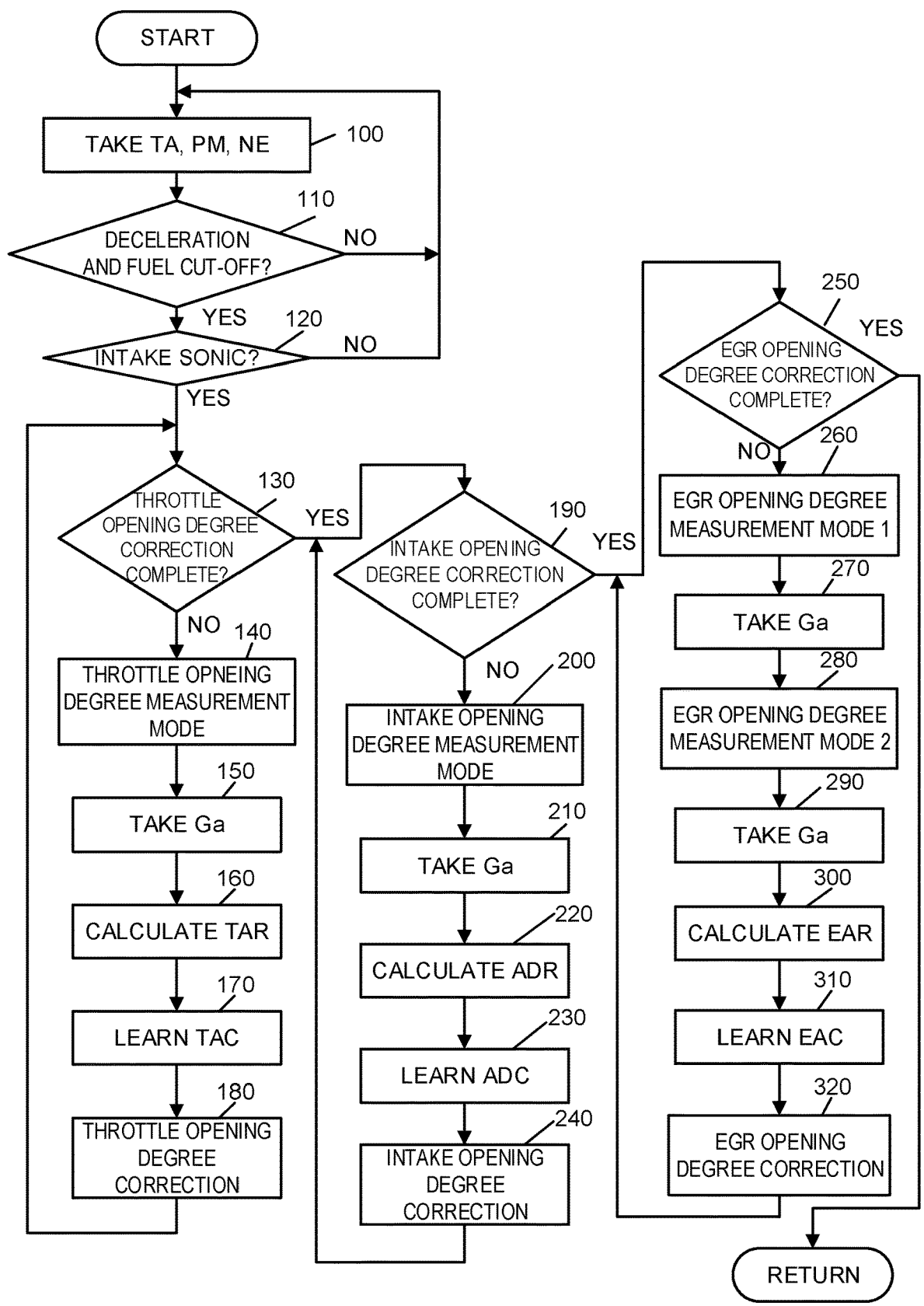
FIG. 2 is a flowchart showing a process of EGR correction control in the embodiment.

FIG. 2 is a flow chart illustrating a process of the EGR correction control. When the process proceeds to this routine, in a step 100, the ECU 50 takes a throttle opening degree TA, intake pressure PM, and engine rotation speed NE from the throttle sensor 41, the intake pressure sensor 43, and the rotation speed sensor 45, respectively.

Then, in a step 110, the ECU 50 determines whether operation of the engine 1 is in a state of deceleration and fuel cut-off. Namely, the ECU 50 determines whether the engine 1 is under deceleration state and shut off with supply of fuel. The ECU 50 returns the process to the step 100 when this determination result is negative, and when the result is affirmative, the process proceeds to a step 120.

In the step 120, the ECU 50 determines whether the intake air passing through the electronic throttle device 6 (the throttle valve 6a) is sonic. Namely, during deceleration and fuel cut-off, the ECU 50 determines whether the intake air passes through the throttle valve 6a at sonic speed. The ECU 50 makes this decision based on the intake pressure PM. The ECU 50 returns the process to the step 100 when this determination result is negative, and when the result is affirmative, the process proceeds to a step 130.

In the step 130, the ECU 50 determines whether the throttle opening degree correction for the throttle valve 6a is completed. The ECU 50 proceeds with the process to a step 140 when the determination result is negative, and when the result is affirmative, the process proceeds to a step 190.

Figure 3:
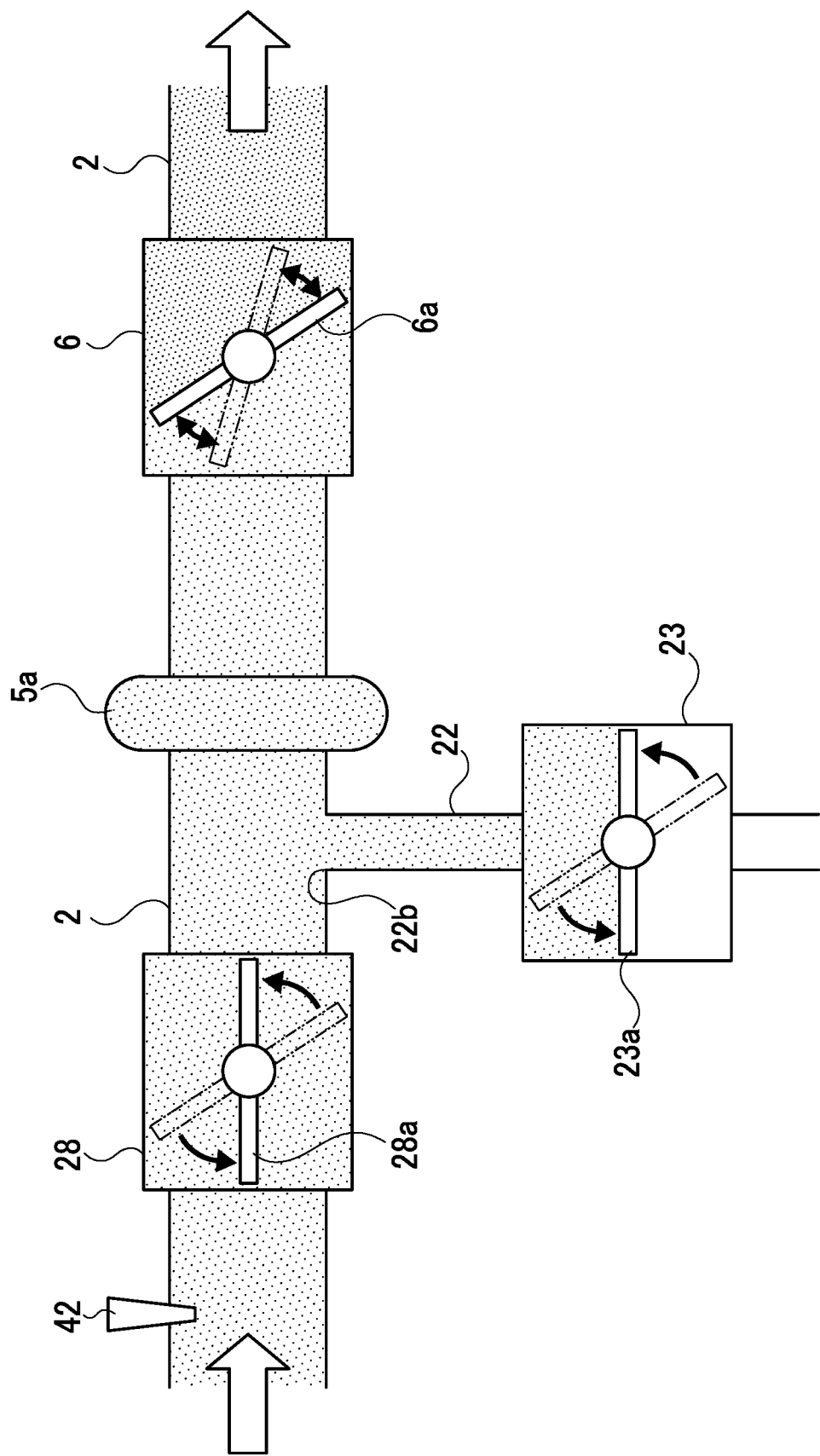
FIG. 3 is a conceptual diagram illustrating each state of a throttle valve, an EGR valve, and an intake valve in a throttle opening degree measurement mode in the embodiment.

In the step 140, the ECU 50 carries out processing of a throttle opening degree measurement mode for the throttle valve 6a. FIG. 3 is a conceptual diagram showing a state of the throttle valve 6a, the EGR valve 23, and the intake valve 28 in the step 140. Specifically, the ECU 50 controls the throttle valve 6a to be open at its master opening degree of a predetermined value, for example, "7 deg", controls the intake valve 28 to be fully open at its master opening degree of "90 deg", and controls the EGR valve 23 to be fully closed at its master opening degree of 0% as shown in FIG. 3. During this processing, the intake air passes through the throttle valve 6a at sonic speed, and the pressure on the upstream side of the throttle valve 6a is nearly a known value of atmospheric pressure.

In a step 150, subsequently, the ECU 50 takes the intake amount Ga based on the value detected by the air flow meter 42. The intake air passing through the throttle valve 6a flows at sonic speed, and thus the intake amount Ga detected by the air flow meter 42 remains stable at a settled value even if the engine rotation speed NE varies to some extent.

In a step 160, the ECU 50 calculates an actual opening degree (throttle actual opening degree) TAR of the throttle valve 6a based on the detected intake amount Ga and a reference formula (F) of a flow rate of gas passing through a valve. The reference formula (F) is represented as:

$$dm = A \cdot Cq \cdot Cm \cdot Pup/\sqrt{Tup} \qquad (F)$$

where dm denotes the intake amount Ga (a quantitative flow rate) as a known value, A denotes an opening area of the throttle valve 6a with variations in products, Cq denotes a discharge coefficient of the throttle valve 6a as a known value, Cm denotes a flow coefficient of the throttle valve 6a as a known value in a sonic range, Pup denotes pressure on the upstream side of the throttle valve 6a, which is known as atmospheric pressure, and Tup denotes a temperature on the upstream side of the throttle valve 6a, which is known as an atmospheric temperature. Accordingly, from the reference formula (F), it is possible to specify the opening area A of the throttle valve 6a which is open at the predetermined master opening degree from the relation of the intake amount Ga (dm) and the sonic range, and thus a throttle actual opening degree TAR is obtained from the opening area A. The opening area A can be accurately obtained since the intake air flows at sonic speed, and accordingly, the throttle actual opening degree TAR can also be accurately obtained.

In a step 170, the ECU 50 learns a throttle opening degree correction value TAC. Specifically, the ECU 50 obtains the throttle opening degree correction value TAC as a difference between the throttle actual opening degree TAR and the master opening degree of the throttle valve 6a, and the obtained correction value TAC is stored in the memory.

Figure 4:
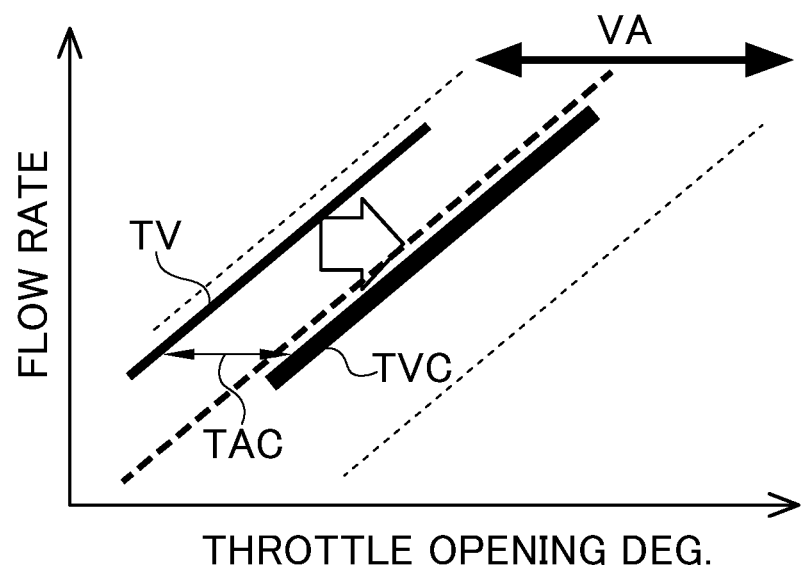
FIG. 4 is a conceptual view of a throttle opening degree map in the embodiment.

In a step 180, the ECU 50 carries out the throttle valve opening degree correction. Specifically, the ECU 50 performs correction of a predetermined throttle opening degree map value by the throttle opening degree correction value TAC. FIG. 4 is a conceptual view of a throttle opening degree map. As shown in FIG. 4, a relation between the flow rate and the throttle opening degree has variations VA in products in general. A post-correction target value TVC can be obtained by subtracting the throttle opening degree correction value TAC from a pre-correction target value TV, for example. The throttle opening degree map is thus corrected, achieving prevention of variations in an opening degree due to the product tolerance of the throttle valve 6a and chronological changes in the opening degree.

The ECU 50 completes the throttle opening degree correction in the step 180, proceeds with a step 190 from the step 130, and then determines whether intake valve opening degree correction for the intake valve 28 has finished in the step 190. The ECU 50 proceeds with the process to a step 200 when this determination result is negative, and when the result is affirmative, the process proceeds to a step 250.

Figure 5:
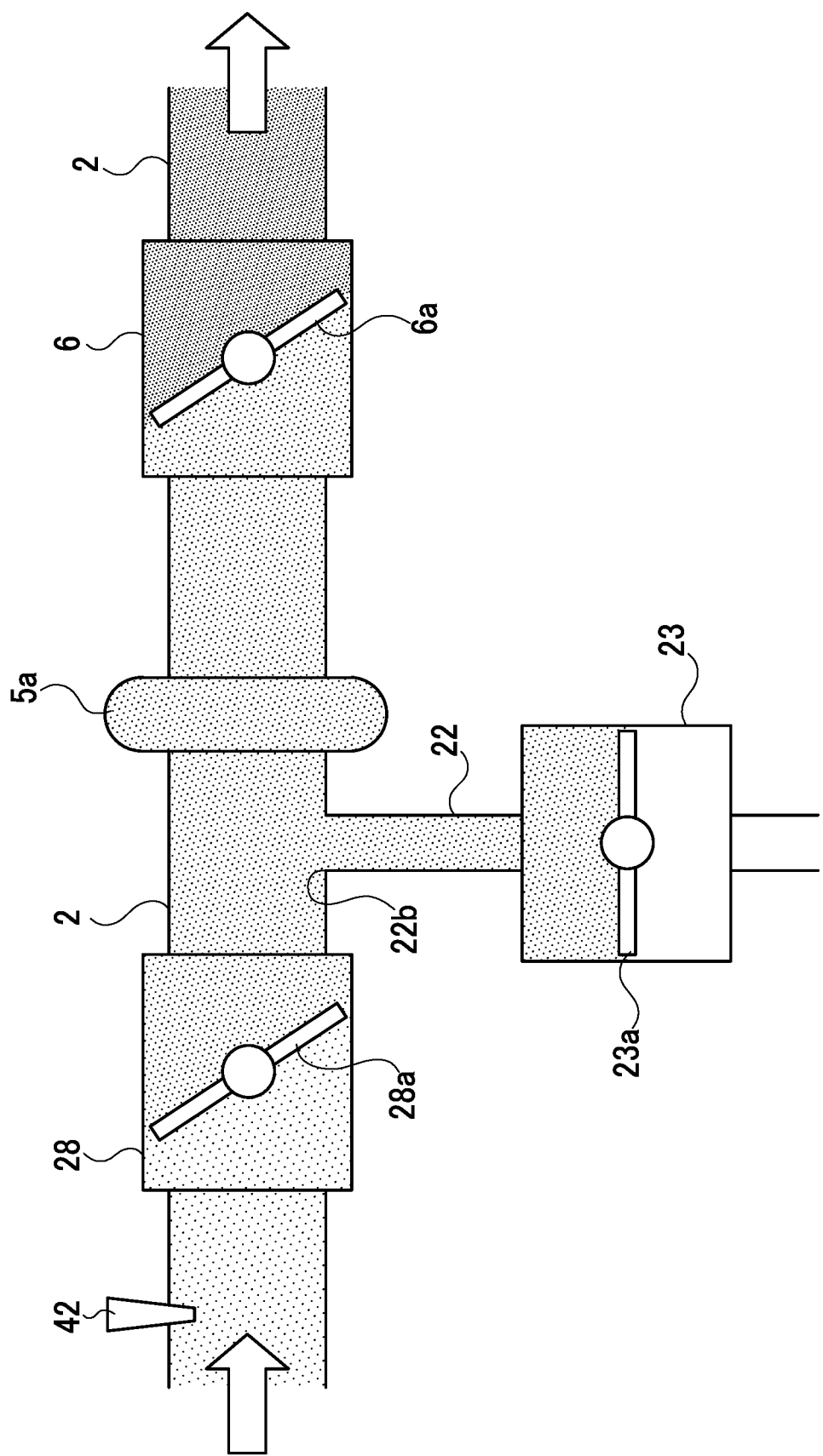
FIG. 5 is a conceptual diagram illustrating each state of the throttle valve, the EGR valve, and the intake valve in an intake opening degree measurement mode in the embodiment.

In the step 200, the ECU 50 carries out processing of an intake valve opening degree measurement mode for the intake valve 28. FIG. 5 is a conceptual diagram showing a state of the throttle valve 6a, the EGR valve 23, and the intake valve 28 in the process. Specifically, the ECU 50 controls the throttle valve 6a to be open at the post-correction opening degree of a predetermined value ("equivalent to 7 deg", for example), controls the intake valve 28 to be closed at the master opening degree of a predetermined value "8 deg", for example) from full-opening, and controls the EGR valve 23 to be closed at the master opening degree of full closing ("0%"). During this process, the intake air passes through the throttle valve 6a at sonic speed, and the upstream side of the intake valve 28 is put under atmospheric pressure (known value).

Subsequently, in a step 210, the ECU 50 takes the intake amount Ga based on the value detected by the air flow meter 42. Herein, the intake air passing through the throttle vale 6a flows at sonic speed, and thus the intake amount Ga detected by the air flow meter 42 remains stable at a settled value.

Figure 6:
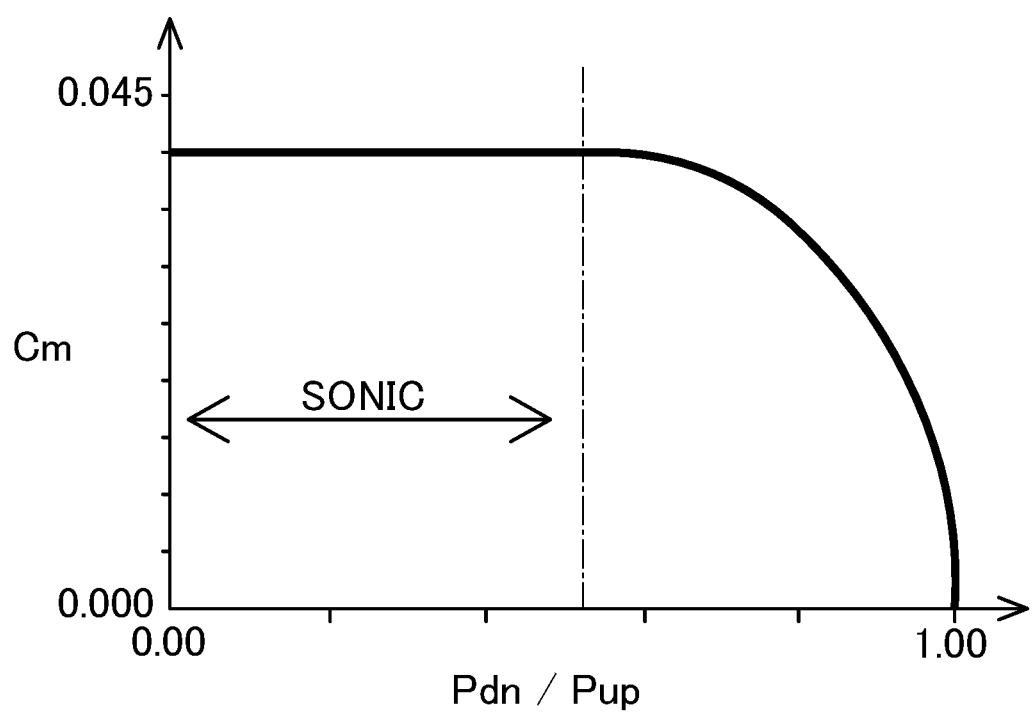
FIG. 6 is a graph showing a relation between a pressure ratio of pressure on a downstream side of a valve to pressure on an upstream side of the valve and a flow coefficient of the valve in the embodiment.

In a subsequent step 220, the ECU 50 calculates an actual opening degree (intake actual opening degree) ADR of the intake valve 28 based on the detected intake amount Ga and the above-mentioned reference formula (F). In this step 220, the sign designated as "dm" in the formula (F) represents the intake amount Ga as a known value. The sign "A" represents an opening area of the intake valve 28 with variations in products. The sign "Cq" represents a discharge coefficient of the intake valve 28 as a known value. The sign "Cm" represents a flow coefficient of the intake valve 28, and this "Cm" can be obtained by a relation between the pressure (intake negative pressure) "Pdn" on the downstream side of the intake valve 28 and the pressure "Pup" on the upstream side of the intake valve 28. FIG. 6 is a graph showing a relation of a ratio "Pdn/Pup" of downstream-side pressure "Pdn" to upstream-side pressure "Pup" of a certain valve and the flow coefficient "Cm." The flow coefficient "Cm" of the intake valve 28 can be specified from this graph. The sign "Pup" in the formula (F) represents the upstream-side pressure of the intake valve 28 as a known value of the atmospheric pressure. "Pdn" corresponds to pressure "Pup" on the upstream side of the throttle valve 6a. This "Pup" can be obtained by applying the formula (F) to the throttle valve 6a. The opening area A of the throttle valve 6a is known in the step 170. Each of the values "dm," "Tup," and "Cq" is known. The intake air in the throttle valve 6a flows at sonic speed, and thus the value "Cm" is known. The value "Pup" can be calculated by those values. Accordingly, the opening area A when the intake valve 28 is open at a predetermined master opening degree can be specified by the formula (F), and thus the intake actual opening degree ADR is obtained.

Subsequently, in a step 230, the ECU 50 learns the intake valve opening degree correction value ADC. To be specific, the ECU 50 obtains the intake opening degree correction value ADC as a difference between the intake actual opening degree ADR and the master opening degree of the intake valve 28, and then the obtained value is stored in the memory.

In a subsequent step 240, the ECU 50 carries out the intake valve opening degree correction. To be specific, the ECU 50 performs correction of an intake opening degree map value with the intake opening degree correction value ADC. A post-correction target value can be obtained by, for example, adding or subtracting the intake opening degree correction value ADC with or from a pre-correction target value. This correction operation of the intake opening degree map contributes to prevention in the opening variations due to the manufacturing tolerance and prevention in the chronological changes in the opening degree of the intake valve 28.

The process proceeds to a step 250 from the step 190 after completion of the intake opening degree correction in the step 240, and the ECU 50 determines whether the EGR valve opening degree correction for the EGR valve 23 is completed in the step 250. The ECU 50 proceeds with the process to a step 260 when the determination result is negative, and when the result is affirmative, the ECU 50 returns the process to the step 100.

In the step 260, the ECU 50 carries out the processing of a first EGR opening degree measurement mode for the EGR valve 23. To be specific, the ECU 50 controls the throttle valve 6a to be open at the post-correction opening degree of a predetermined value ("equivalent to 7 deg", for example), controls the intake valve 28 to be open at the post-correction opening degree of a predetermined value ("equivalent to 8 deg", for example), and controls the EGR valve 23 to be closed at the master opening degree in a full-closed state ("0%") as a first opening degree so that the valves are in the state as similar to the state shown in FIG. 5. During this processing, the intake air passing through the throttle valve 6a flows at sonic speed, and the intake air passing through the intake valve 28 flows at subsonic speed.

In a subsequent step 270, the ECU 50 takes the intake amount Ga based on the value detected by the air flow meter 42. The intake air passing through the throttle valve 6a flows at sonic speed in this step, too, and accordingly, the intake amount Ga detected by the air flow meter 42 becomes a stable settled value.

Figure 7:
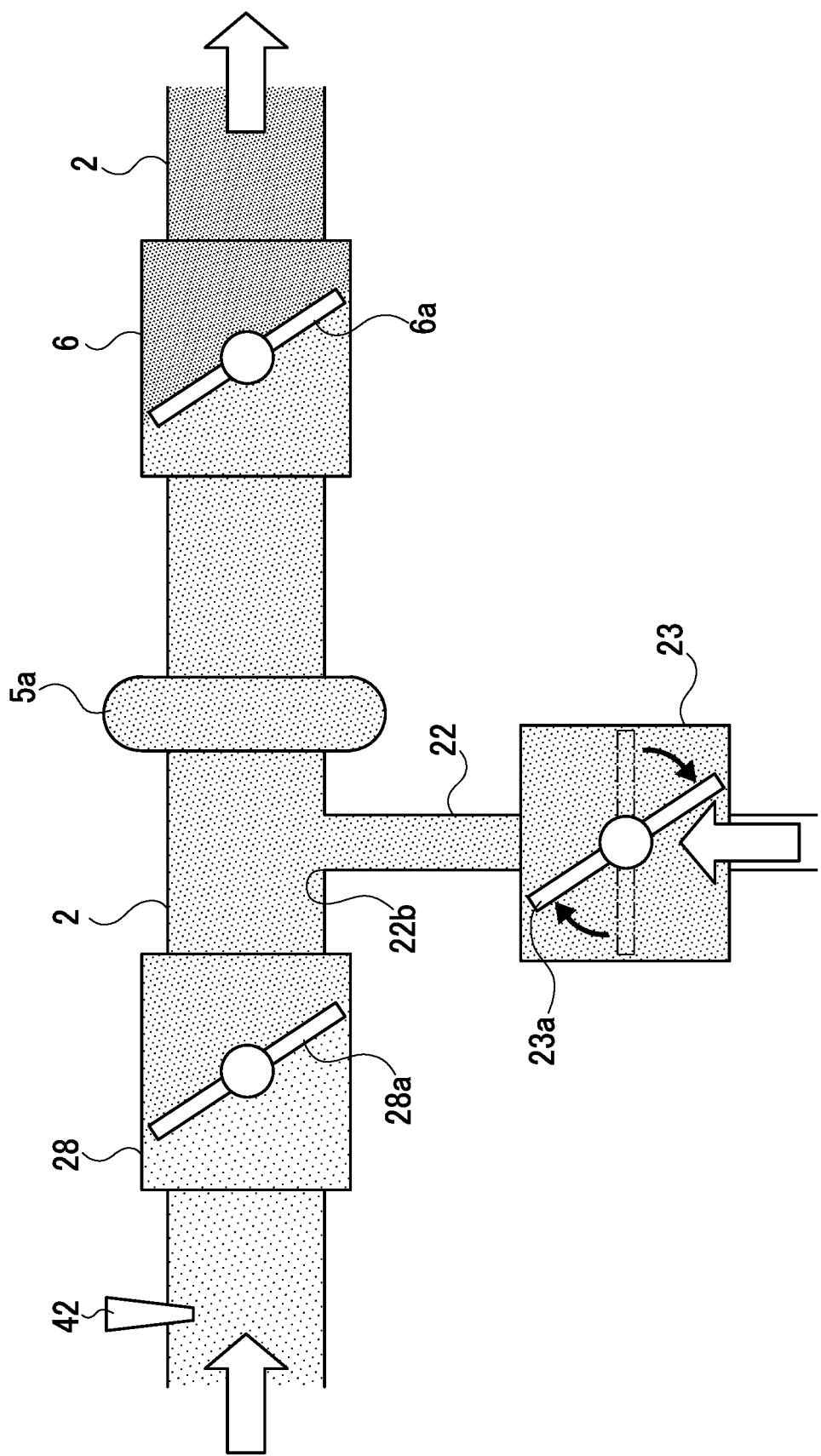
FIG. 7 is a conceptual diagram illustrating each state of the throttle valve, the EGR valve, and the intake valve in an EGR opening degree measurement mode in the embodiment.

In a step 280, the ECU 50 carries out the processing of a second EGR opening degree measurement mode for the EGR valve 23. FIG. 7 is a conceptual diagram showing a state of the throttle valve 6a, the EGR valve 23, and the intake valve 28 in the subject process. As shown in FIG. 7, the ECU 50 controls the throttle valve 6a to be open at the post-correction opening degree of a predetermined value ("equivalent to 7 deg", for example), controls the intake valve 28 to be open at the post-correction opening degree of a predetermined value ("equivalent to 8 deg", for example), and controls the EGR valve 23 to be open at the master opening degree of a predetermined value ("25%", for example) as a second opening degree from the fully closed state. During this processing, the intake air passing through the throttle valve 6a flows at sonic speed, the intake air passing through the intake valve 28 flows at subsonic speed, and the EGR gas passing through the EGR valve 23 flows at subsonic speed. In a subsequent step 290, the ECU 50 takes the intake air amount Ga based on the value detected by the air flow meter 42. The intake air passing through the throttle valve 6a flows at sonic speed in this step, too, and accordingly, the intake amount Ga detected by the air flow meter 42 becomes a stable settled value.

In a step 300, the ECU 50 calculates an actual opening degree (EGR actual opening degree) EAR of the EGR valve 23 by use of a pressure difference of the upstream-side pressure and the downstream-side pressure (differential pressure between a front side and a rear side) of the EGR valve 23 and the EGR gas flow rate of the EGR gas flowing through the EGR valve 23. The pressure of the intake valve 28 on the downstream side, which is as well as the downstream side of the EGR valve 23, is known (accurately estimated) when the intake valve 28 is open at the predetermined post-correction opening degree ("equivalent to 8 deg", for example). During deceleration and fuel cut-off of the engine 1, the upstream-side pressure of the EGR valve 23 is nearly atmospheric pressure, and accordingly, the front-and-rear differential pressure of the EGR valve 23 is known. Further, the ECU 50 obtains the EGR gas flow rate of the EGR gas flowing through the EGR valve 23 from a changing amount of the intake amount Ga in the step 290 relative to the intake amount Ga in the step 270. These values of the front-and-rear differential pressure of the EGR valve 23, the EGR gas flow rate, the discharge coefficient, and the flow coefficient contribute to specifying an opening area of the EGR valve 23 which is open at the master opening degree (such as "25%"), and thus the EGR actual opening degree EAR is obtained.

In a subsequent step 310, the ECU 50 learns the EGR opening degree correction value EAC. Specifically, the ECU 50 obtains the difference between the EGR actual opening degree EAR and the master opening degree of the EGR valve 23 as the EGR opening degree correction value EAC, and the thus obtained value EAC is stored in the memory.

In a step 320, the ECU 50 carries out the EGR opening degree correction. To be specific, the ECU 50 corrects the EGR opening degree map value by the EGR opening degree correction value EAC. The ECU 50 obtains a post-correction target value by, for example, adding or subtracting the EGR opening degree correction value EAC with or from a pre-correction target value. This correction of the EGR opening degree map contributes to prevention of opening degree variations due to the product tolerance and prevention of chronological changes in the opening degree of the EGR valve 23.

After completion of the EGR opening degree correction in the step 320, the ECU 50 returns the process to the step 100 from the step 250.

FIG. 8 is a table showing items related to "throttle opening degree correction" (an event (1)), "intake opening degree correction" (an event (2)), and "EGR opening degree correction" (an event (3)), wherein the items include "a master opening degree," "flow velocity," "measurement item (intake amount)," and "specified item" which are arranged and illustrated in one table. As shown in FIG. 8, in the throttle opening degree correction of the event (1), the throttle opening degree is made to be the master opening degree of "7 deg (including gaps)", the intake opening degree is made to be the master opening degree of "90 deg", and the EGR opening degree is made to be the master opening degree of "0%." During this event, the flow velocity of the throttle valve 6a is set at "sonic speed" and the flow velocity of the intake valve 28 is set at "subsonic speed." The measurement item (intake amount) is an "absolute flow rate." The specified item is an "opening area of the throttle valve 6a." In the intake opening degree correction of the event (2), the throttle opening degree is made to be the post-correction opening degree "equivalent to 7 deg", the intake opening degree is made to be the master opening degree of "8 deg (including gaps)", and the EGR opening degree is made to be the master opening degree of "0%." During this event, the flow velocity of the throttle valve 6a is set at "sonic speed" and the flow velocity of the intake valve 28 is set at "subsonic speed." The measurement item (intake amount) is the "absolute flow rate." The specified items are "intake negative pressure" and an "opening area of the intake valve 28." In the EGR opening degree correction of the event (3), the throttle opening degree is made to be the post-correction opening degree "equivalent to 7 deg", the intake opening degree is made to be the post-correction opening degree "equivalent to 8 deg", and the EGR opening degree is made to be the master opening degree of "25% (including gaps)." During this event, the flow velocity of the throttle valve 6a is set at "sonic speed", the flow velocity of the intake valve 28 is set at "subsonic speed", and the flow velocity of the EGR valve 23 is set at "subsonic speed." The measurement item (intake amount) is "the changing flow rate changed from the event (2)." The specified item is the "opening area of the EGR valve 23."

Figure 9:
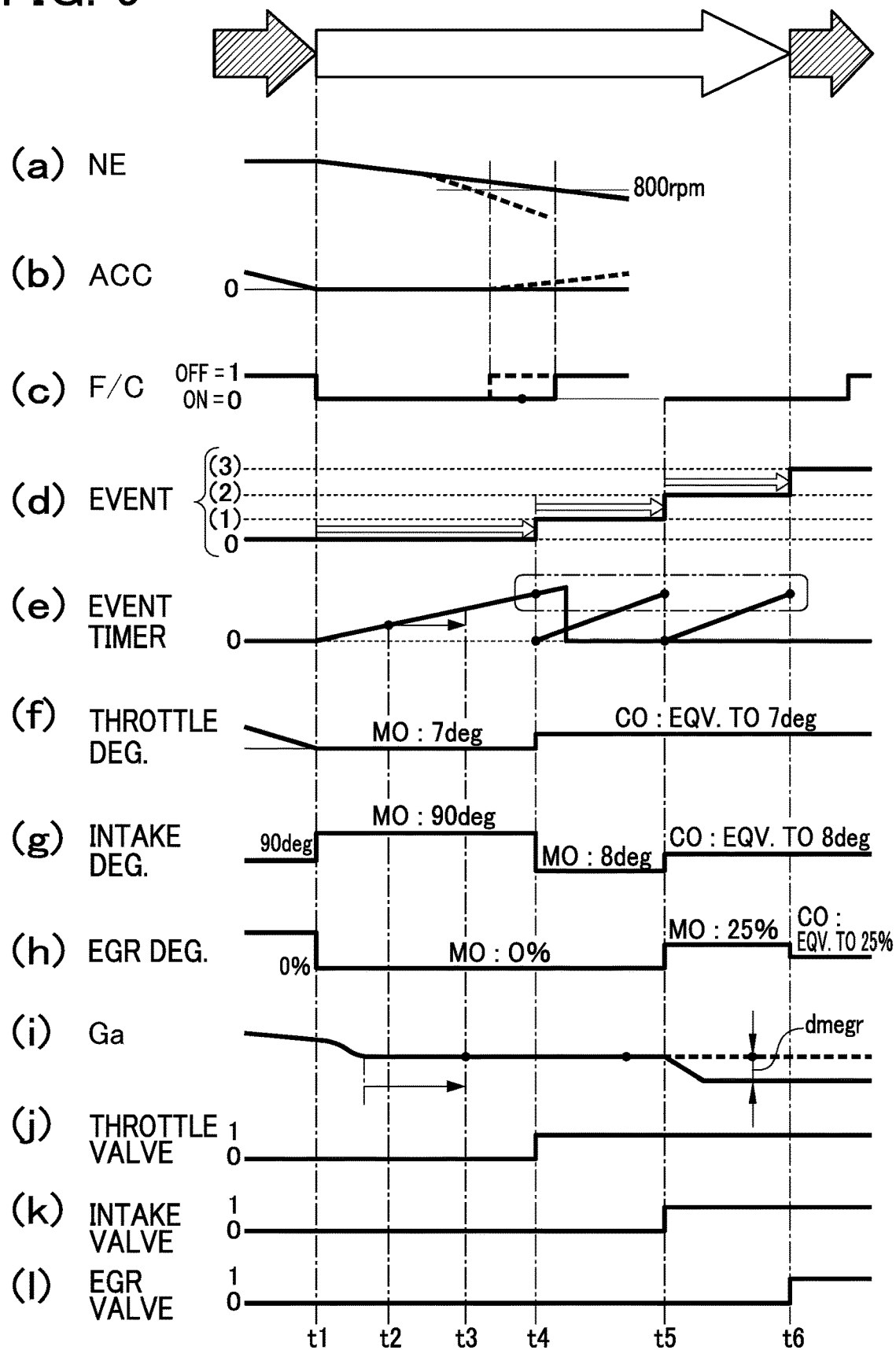
FIG. 9 is a time chart showing one example of behavior of each parameter for EGR correction control in the embodiment.

FIG. 9 is a time chart showing one example of behavior of each parameter related to the EGR correction control. In FIG. 9, each of reference signs (a) to (c) denotes parameter for determination of deceleration and fuel cut-off (F/C) in which (a) represents the rotation speed NE, (b) represents the accelerator opening degree ACC, and (c) represents presence or absence of the fuel cut-off (F/C). A reference sign (d) denotes the events (1) to (3) in which (1) indicates the throttle opening degree correction, (2) indicates the intake opening degree correction, and (3) indicates the EGR opening degree correction. A reference sign (e) denotes changes in an event timer. Each of reference signs (f) to (h) denotes changes in the respective reference opening degrees, in which (f) represents the throttle opening degree, (g) represents the intake opening degree, (h) represents the EGR opening degree. Each of reference signs (i) to (1) denotes timing of completion of the opening degree correction, in which (i) represents the intake amount Ga, (j) represents the throttle valve, (k) represents the intake valve, and (1) represents the EGR valve.

According to the time chart shown in FIG. 9, at a time t1, the engine 1 is determined to be under deceleration and fuel cut-off state when the accelerator opening degree ACC becomes "0" at the engine rotation speed NE of "800 rpm" or more, for example. This determination causes start of the throttle opening degree correction in the event (1) at the time t1, and the event timer starts timing. Further, for the throttle opening degree correction, the throttle opening degree is made to be a master opening degree MO of "7 deg", the intake opening degree is made to be the master opening degree MO of "90 deg", and the EGR opening degree is made to be the master opening degree MO of "0%." The throttle opening degree correction starts at the time t1 and is completed at a time t4. During this correction event, when a predetermined time has elapsed since the start of timing by the event timer (for example, "0.5 seconds"), data measurement of the intake amount Ga and others is started at a time t2 and terminated at a time t3. The intake amount Ga in this event gradually decreases at the time t1 and becomes stable until a time t5.

When the throttle opening degree correction is completed at the time t4, the intake opening degree correction of the event (2) is started from this time t4 and timing by the event timer is restarted. At this time t4, the throttle opening degree is made to be a post-correction opening degree CO "equivalent to 7 deg", the intake opening degree is made to be the master opening degree MO of "8 deg", and the EGR opening degree is made to be the master opening degree MO of "0%" for the intake opening degree correction. The intake opening degree correction is started at the time t4 and completed at the time t5. During this event, the intake amount Ga continuously remains at a settled value.

When the intake opening degree correction is completed at the time t5, the EGR opening degree correction of the event (3) is started at the same time t5 and timing by the event timer is restarted. At the time t5, the throttle opening degree is made to be the post-correction opening degree CO "equivalent to 7 deg", the intake opening degree is made to be the post-correction opening degree CO "equivalent to 8 deg", and the EGR opening degree is made to be the master opening degree MO of "25%" for the EGR opening degree correction. The EGR opening degree correction is started at the time t5 and completed at a time t6. During this event, the intake amount Ga once decreases and then remains settled. The changing amount DMegr of the intake amount during this period corresponds to the EGR gas flow rate when the EGR opening degree is "25%." When the EGR opening degree correction is completed at the time t6, in the following time after the time t6, the throttle opening degree is made to be the post-correction opening degree CO "equivalent to 7 deg", the intake opening degree is made to be the post-correction opening degree CO "equivalent to 8 deg", and the EGR opening degree is made to be the post-correction opening degree CO "equivalent to 25%" so that a target flow rate of the EGR gas is monitored.

As shown in FIG. 9, each of the throttle opening degree correction, the intake opening degree correction, and the EGR opening degree correction is carried out in a period of time from t1 to t6 while the operation of the engine 1 is under deceleration and fuel cut-off state.

According to the above-explained EGR control apparatus for the engine with the supercharger and the control method of the EGR device of the embodiment, the ECU 50 carries out the above-mentioned EGR correction control during operation of the engine 1. In the EGR correction control, the ECU 50 controls the EGR valve 23 to be fully closed and controls the intake valve 28 to be fully open during deceleration and fuel cut-off of the engine 1, and further controls the throttle valve 6a to be open at a predetermined opening degree so that the intake air flows through the throttle valve 6a at sonic speed. During this control operation, the ECU 50 obtains the throttle actual opening degree TAR related to the throttle valve 6a from the intake amount Ga detected by the air flow meter 42 and the reference formula (F) of a predetermined valve passing flow rate, learns the throttle opening degree correction value TAC of the throttle valve 6a from the difference between the throttle actual opening degree TAR and the predetermined master opening degree, and corrects the control of the throttle valve 6a based on the thus learned throttle opening degree correction value TAC. The ECU 50 subsequently controls the EGR valve 23 to be fully closed and controls the intake valve 28 to be closed at the predetermined opening degree during deceleration and fuel cut-off of the engine 1 after the control of the throttle valve 6a has been corrected based on the learned throttle opening degree correction value TAC. During this control operation, the ECU 50 obtains the intake actual opening degree ADR for the intake valve 28 based on the intake amount Ga detected by the air flow meter 42 and the reference formula (F), learns the intake opening degree correction value ADC of the intake valve 28 from the difference between the intake actual opening degree ADR and the predetermined master opening degree of the intake valve 28, and corrects the control of the intake valve 28 based on the thus learned intake opening degree correction value ADC. According to this EGR correction control, the control of the throttle valve 6a and the control of the intake valve 28 are corrected without especially using a pressure sensor specialized for detecting the pressure Pdn on the downstream side of the intake valve 28, and thus the EGR gas flow rate of the EGR gas flowing through the intake passage 2 is corrected irrespective of presence or absence of the opening degree variations in the intake valve 28 when the EGR valve 23 is opened. Therefore, the EGR gas flow rate can be accurately regulated with no use of a specialized pressure sensor irrespective of the opening degree variations in the intake valve 28. Further, in the EGR correction control according to the embodiment, the ECU 50 subsequently controls the EGR valve 23 to be open at a predetermined second opening degree such as "25%" from a predetermined first opening degree such as "0%". The ECU 50 then obtains a changing amount of the intake amount Ga detected by the air flow meter 42 during this control operation as a flow rate changing amount of the EGR gas with respect to changes in an opening degree changed from the first opening degree to the second opening degree during deceleration and fuel cut-off of the engine 1 after the control of the throttle valve 6a and the intake valve 28 has been corrected. The ECU 50 further obtains the pressure difference between the upstream-side pressure and the downstream-side pressure of the EGR valve 23 when the EGR valve 23 is opened to the second opening degree. The ECU 50 further obtains the EGR actual opening degree EAR for the EGR valve 23 based on the obtained flow rate changing amount and the pressure difference, learns the EGR opening degree correction value EAC of the EGR valve 23 from the difference between the EGR actual opening degree EAR and the second opening degree, and corrects the control of the EGR valve 23 based on the thus learned EGR opening degree correction value EAC. According to this EGR correction control, therefore, the control of the EGR valve 23 is further corrected with no use of a specialized pressure sensor for detecting the downstream-side pressure of the intake valve 28, and thus the EGR gas flow rate of the EGR gas flowing through the intake passage 2 is further corrected irrespective of presence or absence of the opening variations in the EGR valve 23 when the EGR valve 23 is opened. Therefore, the EGR gas flow rate can be further accurately regulated with no use of any specialized pressure sensors irrespective of the opening degree variations in the intake valve 28 and the EGR valve 23.

Based on the intake amount Ga detected by the air flow meter 42 and the reference formula (F) of the valve passing flow rate, the configuration of the present embodiment achieves reduction in the variations in the EGR gas flow rate by calculating each difference of the respective actual opening degrees of the throttle valve 6a, the intake valve 28, and the EGR valve 23 (the throttle actual opening degree TAR, the intake actual opening degree ADR, and the EGR actual opening degree EAR) and the respective predetermined master opening degrees and correcting the control of the respective valves 6a, 28, and 23 to be in a center of each tolerances. To be more specific, when it is supposed that a target EGR rate relative to the variations in the EGR rate in a predetermined mode running test by an actual vehicle is "25±1 (%)", a variation range of the EGR rate is reduced to at most "2 (%)" in the present embodiment. This result is superior to a variation range of 9 (%) of the EGR rate in an example where the respective valves 6a, 28, and 23 are not performed with the correction control.

The present disclosure is not limited to the above embodiment and may be partly changed or modified in its configuration without departing from the scope of the disclosure.

In the above embodiment, the EGR correction control includes implementation of the throttle opening degree correction, the intake opening degree correction, and the EGR opening degree correction. Alternatively, the EGR opening degree correction may be omitted, and the EGR correction control may only include the throttle opening degree correction and the intake valve opening degree correction.

The above embodiment is configured such that the throttle opening degree correction, the intake opening degree correction, and the EGR opening degree correction are carried out continuously as a series of events (1) to (3) during deceleration and fuel cut-off of the engine 1. Alternatively, each of the throttle opening degree correction, the intake opening degree correction, and the EGR opening degree correction may be separately carried out in respective deceleration and fuel cut-off times.

In the above embodiment, a usual gasoline engine is configured such that the "EGR correction control" is carried out when the intake air passing through the electronic throttle device 6 (the throttle valve 6a) passes at sonic speed during deceleration and fuel cut-off of the engine 1. Alternatively, a usual gasoline engine vehicle and a hybrid vehicle including an engine and a motor may be configured such that the "EGR correction control" is carried out any time when the intake air passing through the electronic throttle device 6 passes at sonic speed irrespective of the deceleration and fuel cut-off of the engine. Specifically, a usual gasoline engine vehicle, a "parallel type" hybrid vehicle and a "power-sprit" hybrid vehicle may be configured such that the "EGR correction control" is carried out during a steady operation of the engine and when the intake air passing through the electronic throttle device passes at sonic speed. Further alternatively, a "series type" hybrid vehicle may be configured such that the EGR correction control is carried out when the intake air passing through the electronic throttle device passes at sonic speed. The above-mentioned "parallel type" vehicle indicates a vehicle utilizing both the engine and the motor for driving wheels. The "power-sprit" vehicle indicates a vehicle configured to divide a motive power from the engine by use of a power dividing mechanism and distribute the divided motive power to a generator and the wheels and configured to appropriately synthesize driving force from the engine and the motor. The "series type" vehicle indicates a vehicle in which the engine is used only for power generation and the motor is used only for driving the wheels and regeneration, the vehicle further including a storage battery for collecting the electric power. Namely, the "series type" hybrid vehicle is specifically an electric vehicle mounted with an engine as an electricity generation source.

INDUSTRIAL APPLICABILITY

The present disclosure may be utilized for a low-pressure loop EGR device which is formed with an engine with a supercharger.

REFERENCE SIGNS LIST

1 Engine
2 Intake passage
3 Exhaust passage
5 Supercharger
5a Compressor
5b Turbine
5c Rotary shaft
6 Electronic throttle device (Intake amount regulating valve)
6a Throttle valve
21 EGR device
22 EGR passage
22a Inlet
22b Outlet
23 EGR valve
28 Intake valve
42 Air flow meter (Intake amount detection member)
50 ECU (Control unit)

What is claimed is:

1. An EGR control apparatus for an engine with a supercharger comprising:
the supercharger provided in an intake passage and an exhaust passage for the engine to increase pressure of intake air flowing in the intake passage, the supercharger including a compressor placed in the intake passage, a turbine placed in the exhaust passage, and a rotary shaft connecting the compressor and the turbine in an integrally rotatable manner;
an EGR passage configured to bring a part of exhaust gas having been discharged out from the engine to the exhaust passage into the intake passage so that the exhaust air is recirculated into the engine as EGR gas, the EGR passage having an inlet connected to the exhaust passage downstream of the turbine and an outlet connected to the intake passage upstream of the compressor;
an EGR valve configured to regulate a flow rate of the EGR gas flowing in the EGR passage;
an intake amount regulation valve provided in the intake passage downstream of the compressor for regulating an intake amount of intake air flowing through the intake passage;
an intake valve provided in the intake passage upstream of the outlet of the EGR passage for narrowing the intake amount of the intake air flowing through the intake passage;
an intake amount detection member for detecting the intake amount of the intake air flowing through the intake passage upstream of the intake valve; and
a control unit for controlling at least the EGR valve, the intake amount regulation valve, and the intake valve, wherein
the control unit obtains an actual opening degree of the intake amount regulation valve based on the intake amount detected by the intake amount detection member and a reference formula of a valve passing flow rate when the EGR valve is made to fully close and the intake valve is made to fully open and the intake amount regulation valve is made to open at a predetermined opening degree such that the intake air flows through the intake amount regulation valve at sonic speed, the control unit learns an opening degree correction value of the intake amount regulation valve from a difference between the obtained actual opening degree and the predetermined opening degree, and the control unit performs correction control of the intake amount regulation valve based on the learned opening degree correction value, in which the reference formula is represented as:

$$dm = A \cdot Cq \cdot Cm \cdot Pup/\sqrt{Tup} \qquad (F)$$

where dm denotes an intake amount, A denotes an opening area of a valve, Cq denotes a discharge coefficient of the valve, Cm denotes a flow coefficient of the valve, Pup denotes pressure on an upstream side of the valve, Tup denotes a temperature on the upstream side of the valve, the control unit obtains an actual opening degree of the intake valve based on the intake amount detected by the intake amount detection member and the reference formula (F) when the EGR valve is made to fully close and the intake valve is made to close at a predetermined opening degree after the control unit performs correction control of the intake amount regulation valve based on the learned opening degree correction value of the intake amount regulation valve, the control unit learns an opening degree correction value of the intake valve based on a difference between the obtained actual opening degree and the predetermined opening degree of the intake valve, and the control unit performs correction control of the intake valve based on the learned opening degree correction value.

2. An EGR control apparatus for an engine with a supercharger comprising:

the supercharger provided in an intake passage and an exhaust passage for the engine to increase pressure of intake air flowing in the intake passage, the supercharger including a compressor placed in the intake passage, a turbine placed in the exhaust passage, and a rotary shaft connecting the compressor and the turbine in an integrally rotatable manner;

an EGR passage configured to bring a part of exhaust gas having been discharged out from the engine to the exhaust passage into the intake passage so that the exhaust gas is recirculated into the engine as EGR gas, the EGR passage having an inlet connected to the exhaust passage downstream of the turbine and an outlet connected to the intake passage upstream of the compressor;

an EGR valve configured to regulate a flow rate of the EGR gas flowing in the EGR passage;

an intake amount regulation valve provided in the intake passage downstream of the compressor for regulating an intake amount of intake air flowing through the intake passage;

an intake valve provided in the intake passage upstream of the outlet of the EGR passage for narrowing the intake amount of the intake air flowing through the intake passage;

an intake amount detection member for detecting the intake amount of the intake air flowing through the intake passage upstream of the intake valve; and a control unit for controlling at least the EGR valve, the intake amount regulation valve, and the intake valve, wherein during deceleration and fuel cut-off of the engine, the control unit obtains an actual opening degree of the intake amount regulation valve based on the intake amount detected by the intake amount detection member and a reference formula of a valve passing flow rate when the EGR valve is made to fully close and the intake valve is made to fully open and the intake amount regulation valve is made to open at a predetermined opening degree such that the intake air flows through the intake amount regulation valve at sonic speed, the control unit learns an opening degree correction value of the intake amount regulation valve from a difference between the obtained actual opening degree and the predetermined opening degree, and the control unit performs correction control of the intake amount regulation valve based on the learned opening degree correction value, in which the reference formula is represented as:

$$dm = A \cdot Cq \cdot Cm \cdot Pup/\sqrt{Tup} \qquad (F)$$

where dm denotes an intake amount, A denotes an opening area of a valve, Cq denotes a discharge coefficient of the valve, Cm denotes a flow coefficient of the valve, Pup denotes pressure on an upstream side of the valve, Tup denotes a temperature on the upstream side of the valve, during deceleration and fuel cut-off of the engine, the control unit obtains an actual opening degree of the intake valve based on the intake amount detected by the intake amount detection member and the reference formula (F) when the EGR valve is made to fully close and the intake valve is made to close at a predetermined opening degree after the control unit performs correction control of the intake amount regulation valve based on the learned opening degree correction value of the intake amount regulation valve, the control unit learns an opening degree correction value of the intake valve based on a difference between the obtained actual opening degree and the predetermined opening degree of the intake valve, and the control unit performs correction control of the intake valve based on the learned opening degree correction value.

3. A control method of an EGR device for an engine with a supercharger, the engine comprising:

the supercharger provided in an intake passage and an exhaust passage for the engine to increase pressure of intake air flowing in the intake passage, the supercharger including a compressor placed in the intake passage, a turbine placed in the exhaust passage, and a rotary shaft connecting the compressor and the turbine in an integrally rotatable manner, and an intake amount regulation valve provided in the intake passage downstream of the compressor for regulating an intake amount of intake air flowing through the intake passage, the EGR device comprising:

an EGR passage configured to bring a part of exhaust gas having been discharged out from the engine to the exhaust passage into the intake passage so that the exhaust gas is recirculated into the engine as EGR gas, the EGR passage having an inlet connected to the exhaust passage downstream of the turbine and an outlet connected to the intake passage upstream of the compressor;

an EGR valve for regulating a flow rate of EGR gas flowing in the EGR passage; and an intake valve provided in the intake passage upstream of the outlet of the EGR passage for narrowing the intake amount of the intake air passing through the intake passage, wherein the control method includes:

obtaining an actual opening degree of the intake amount regulation valve based on the intake amount detected by the intake amount detection member and a reference formula of a valve passing flow rate when the EGR valve is made to fully close, the intake valve is made to fully close, and the intake amount regulation valve is made to open at a predetermined opening degree so that the intake air passes through the intake amount regulation valve at sonic speed, in which the reference formula is represented as:

$$dm = A \cdot Cq \cdot Cm \cdot Pup/\sqrt{Tup} \qquad (F)$$

where dm denotes the intake amount, A denotes an opening area of a valve, Cq denotes a discharge coefficient of the valve, Cm denotes a flow coefficient of the valve, Pup denotes pressure on an upstream side of the valve, and Tup denotes a temperature on the upstream side of the valve, learning an opening degree correction value of the intake amount regulation valve based on a difference between the obtained actual opening degree of the intake amount regulation valve and the predetermined opening degree and correcting control of the intake amount regulation valve based on the learned opening degree correction value, after correcting control of the intake amount regulation valve, obtaining an actual opening degree of the intake valve based on the intake amount detected by the intake amount detection member and the reference formula (F) when the EGR valve is made to fully close and the intake valve is made to close at a predetermined opening degree after performing correction control of the intake amount regulation valve based on the learned opening degree correction value of the intake amount regulation valve, and learning an opening degree correction value of the intake valve from a difference between the obtained actual opening degree of the intake valve and the predetermined opening degree of the intake valve and performing correction control of the intake valve based on the learned opening degree correction value.

4. A control method of an EGR device for an engine with a supercharger, the engine comprising:

the supercharger provided in an intake passage and an exhaust passage for the engine to increase pressure of intake air flowing in the intake passage, the supercharger including a compressor placed in the intake passage, a turbine placed in the exhaust passage, and a rotary shaft connecting the compressor and the turbine in an integrally rotatable manner, and an intake amount regulation valve provided in the intake passage downstream of the compressor for regulating an intake amount of intake air flowing through the intake passage, the EGR device comprising:

an EGR passage configured to bring a part of exhaust gas having been discharged out from the engine to the exhaust passage into the intake passage so that the exhaust gas is recirculated into the engine as EGR gas, the EGR passage having an inlet connected to the exhaust passage downstream of the turbine and an outlet connected to the intake passage upstream of the compressor;

an EGR valve for regulating a flow rate of EGR gas flowing in the EGR passage; and an intake valve provided in the intake passage upstream of the outlet of the EGR passage for narrowing the intake amount of the intake air passing through the intake passage, wherein the control method includes:

during deceleration and fuel cut-off of the engine, obtaining an actual opening degree of the intake amount regulation valve based on the intake amount detected by an intake amount detection member and a reference formula of a valve passing flow rate when the EGR valve is made to fully close, the intake valve is made to fully close, and the intake amount regulation valve is made to open at a predetermined opening degree so that the intake air passes through the intake amount regulation valve at sonic speed, in which the reference formula is represented as:

$$dm = A \cdot Cq \cdot Cm \cdot Pup/\sqrt{Tup} \qquad (F)$$

where dm denotes the intake amount, A denotes an opening area of a valve, Cq denotes a discharge coefficient of the valve, Cm denotes a flow coefficient of the valve, Pup denotes pressure on an upstream side of the valve, and Tup denotes a temperature on the upstream side of the valve, learning an opening degree correction value of the intake amount regulation valve based on a difference between the obtained actual opening degree of the intake amount regulation valve and the predetermined opening degree and correcting control of the intake amount regulation valve based on the learned opening degree correction value, during deceleration and fuel cut-off of the engine after correcting control of the intake amount regulation valve, obtaining an actual opening degree of the intake valve based on the intake amount detected by the intake amount detection member and the reference formula (F) when the EGR valve is made to fully close and the intake valve is made to close at a predetermined opening degree after performing correction control of the intake amount regulation valve based on the learned opening degree correction value of the intake amount regulation valve, and learning an opening degree correction value of the intake valve from a difference between the obtained actual opening degree of the intake valve and the predetermined opening degree of the intake valve and performing correction control of the intake valve based on the learned opening degree correction value.

\* \* \* \* \*